No. 832,867.
PATENTED OCT. 9, 1906.
A. M. LORENTZ.
MILK COOLER.
APPLICATION FILED JULY 12, 1906.
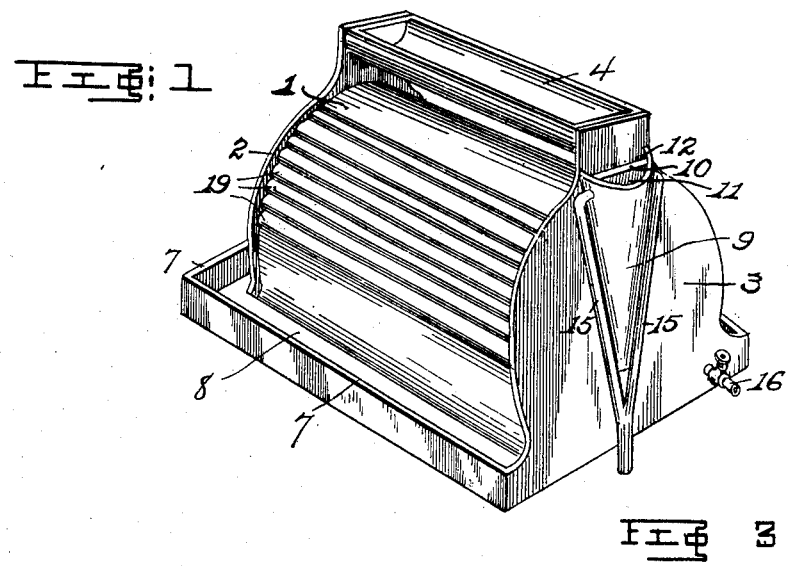
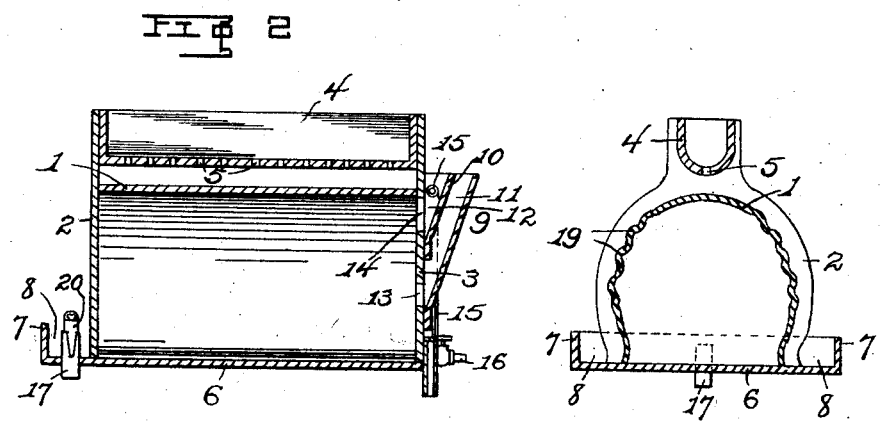
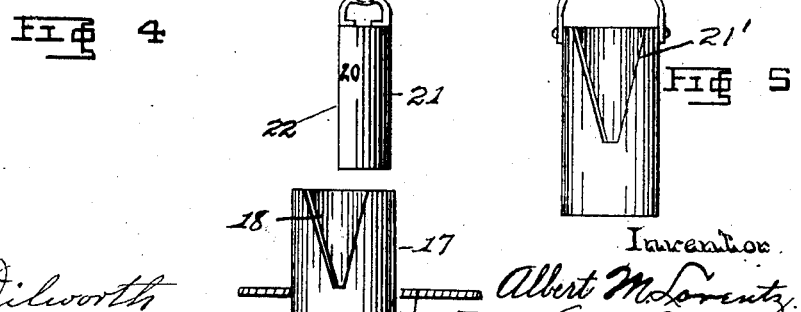
Witnesses:
Robt F. Dilworth
Claud G. Matheney
Inventor
Albert M. Lorentz
By H. E. Dunlap
Attorney

UNITED STATES PATENT OFFICE.

ALBERT M. LORENTZ, OF McMECHEN, WEST VIRGINIA.

MILK-COOLER.

No. 832,867.　　　Specification of Letters Patent.　　　Patented Oct. 9, 1906.

Application filed July 12, 1906. Serial No. 325,852.

*To all whom it may concern:*

Be it known that I, ALBERT M. LORENTZ, a citizen of the United States of America, and a resident of McMechen, county of Marshall, and State of West Virginia, have invented certain new and useful Improvements in Milk-Coolers, of which the following is a specification.

My invention relates to new and useful improvements in milk-coolers, and more particularly to a milk cooling and aerating device; and it consists in the particular construction, arrangement, and combination of parts, which will hereinafter be fully described.

The object of the invention is to provide a simple and comparatively inexpensive milk cooling, aerating, and clarifying device adapted for being furnished either with a constant or intermittent supply of water or ice, or both.

A further object is to provide means for retarding the flow of the milk over the cooler to thoroughly cool the same.

In describing the invention in detail reference is herein had to the accompanying drawings, forming a part of this specification, in which—

Figure 1 is a perspective view of the invention. Figs. 2 and 3 are respectively longitudinal and cross sections of the same. Fig. 4 is an elevation of the discharge-spout and stopper therefor; and Fig. 5 is a similar view of the discharge-spout, showing a modified form of stopper mounted therein.

Referring to said drawings, in which like reference-numerals designate like parts throughout the several views, 1 indicates a cooling-tank, the ends 2 and 3 of which are extended upwardly, constituting frames which support at their upper ends a trough 4, having a rounded bottom with a series of perforations 5 therein. The cooling-tank 1 is substantially semicylindrical in form and is mounted on a flat base 6, as shown. Said base extends beyond the edges of the lower part of the tank on the two sides and on the rear end and has its outer edges 7 upturned, forming gutters 8 on said two sides and end for receiving and carrying the milk to the discharge-outlet. Secured on the outer face of the end 3 of the frame is a tapered funnel-like receptacle 9, which is divided by a wall 10 into two compartments 11 and 12, the first-mentioned compartment communicating at its lower end through a small opening 13 with the interior of the tank, near the bottom thereof, while the last-mentioned compartment communicates, through a relatively large opening 14, with the interior of said tank, at the top thereof. Leading from the opposite sides of the compartment 12, preferably slightly above the top of the tank, are overflow-pipes 15, which extend downward on opposite sides of the receptacle 9 and join, as shown. A drain-pipe 16 is provided for draining the tank.

In the gutter 8 at the rear end of the device is a spout 17, through which the milk is discharged. Said spout consists of a tube inserted through and rigidly secured in the base 6 in said gutter and projected at its upper end above the base to a height approximately equal to the depth of the gutter. Said spout is provided with a substantially V-shaped slot 18 therein, the pointed end of the slot being on a level with the bottom of the gutter, so that the gutters may be thoroughly drained when desired. A stopper or plug 20 is employed for closing the spout 17, said stopper consisting of a cylindrical body having a portion cut from one side thereof, as shown. When it is desired to prevent the milk from flowing through the spout, said stopper is turned in said spout to bring its convex face 21 into a position covering the slot 18, and when it is desired to admit of the flow of the milk through the spout the stopper is turned to bring the cut face 22 into a position registering with said slot 18.

It is apparent that the depth of milk permitted to stand in the gutters before it discharges through the spout may be regulated by manipulation of the stopper—that is, by adjusting the stopper to cause a greater or less degree of registration between the slotted face of the spout and the cut face of the stopper.

The stopper may either be a solid body or may be a hollow cylindrical shell. Secured to the upper end of the stopper is a handle 23, by means of which the manipulation of the stopper is facilitated.

Provided upon the sides of the tank 1 are corrugations 19, which serve to retard the flow of the milk. To prevent the milk from digressing and flowing from the ends of the corrugations, the ends 2 and 3 of the frame are projected beyond the tank, as shown.

In operation the cooling-tank 1 is filled with ice or water. Milk poured into the trough 4 passes through the perforations 5 in small streams, which fall upon the top of the tank, from whence the milk passes down on opposite sides to the gutters 8. The milk is partially cooled and aerated in passing to the tank from the trough, and as it passes over the surface of the tank it is further cooled from contact therewith. The corrugations 19 check the rapidity of the flow, causing the milk to remain in contact with the cooling-tank longer than would be the case were the sides of the tank plain. The stopper 20 is preferably inserted and adjusted in the spout 17 to prevent the immediate discharge of the milk from the gutters—that is, to hold the milk in said gutters until it has reached a considerable depth before overflowing through the spout—thus admitting of the milk and at the same time allowing sediment in the milk to settle to the bottom, being clarified, the sediment settling to the bottom of the gutters.

When water is employed for cooling the tank, it is preferably caused to enter at the bottom through the opening 13, being poured into the compartment 11 of receptacle 9. Fresh water may be admitted at intervals as needed, or a constant circulation may be kept up by having the end of a water-pipe or hose inserted in said compartment 11, the overflow passing from the top of the tank outward through the pipes 15. When ice is employed for cooling, pieces of the same may be inserted in the tank through the compartment 12 and opening 14, and when water is used ice may be inserted, as just mentioned, for cooling the water.

Fig. 5 illustrates a modification of stopper, which comprises a tubular member open at its bottom and formed with a V-shaped slot 21' for register with slot 18 of spout 17.

Having thus fully described my invention, what I claim as new, and desire to secure by Letters Patent, is—

1. A milk-cooler comprising a cooling-tank, a trough having a foraminous bottom supported above said tank, gutters at the base of said tank, and a funnel-like receptacle having a wall therein forming two compartments, each of which communicate with the tank interiorly thereof.

2. A milk-cooler comprising a cooling-tank of semicylindrical form having a roughened surface to retard the flow of milk, a trough having a foraminous bottom supported above said tank and at a point central thereof and a funnel-like receptacle having a wall therein dividing said receptacle into two compartments, each of which communicate with the interior of the tank.

3. A milk-cooler comprising a cooling-tank, having a gutter at the base thereof, a discharge-spout for the gutter composed of a tube which projects in the gutter and which has a V-shaped slot therein, and a plug for closing said spout, said plug comprising a cylindrical body having a cut-away portion for registry with said slot of the discharge-tube.

4. A milk-cooler comprising a cooling-tank, having a gutter, a discharge-spout for said gutter composed of a hollow member having a cut-away portion, and a stopper received in said member and having a cut-away portion to register with said cut-away portion of the spout.

5. A milk-cooler comprising a cooling-tank having a gutter at the base thereof, a discharge-spout for said gutter, said discharge-spout consisting of a hollow member having a cut-away portion, and a stopper received in said member and having a cut-away portion to register with said cut-away portion of the spout, and means for filling said tank.

6. A milk-cooler comprising a cooling-tank having a gutter at the base thereof, a tube mounted in said gutter and projecting thereabove, said tube having a cut-away portion, a stopper having a cut-away portion adapted for mounting in said tube, the cut-away portion of the stopper being adapted for registering with the cut-away portion of the tube, and a funnel-like receptacle at one end of said tank through which the latter is filled.

7. A milk-cooler comprising a cooling-tank having a gutter at the base thereof, a tube mounted in said gutter and projecting thereabove, said tube having a V-shaped slot therein, a stopper having a cut-away portion adapted for mounting in said tube, the cut-away portion of said stopper being adapted to register with the slot in the tube, and a funnel-like receptacle having a wall therein forming two separate compartments, each of which communicate with the interior of the tank.

8. A milk-cooler comprising a cooling-tank having a gutter at the base thereof, and means for controlling the discharge of milk from said gutter, said means comprising a tubular spout mounted in the bottom of the gutter and standing with its upper end projected above said bottom and having a cut-away portion, and a stopper in said spout, said stopper having a cut-away portion and being adapted for adjustment in said spout to cause a greater or less degree of registration between the cut-away portion thereof and the cut-away portion of the spout.

Signed by me in the presence of two subscribing witnesses.

ALBERT M. LORENTZ.

Witnesses:
H. E. DUNLAP,
ROBT. F. DILWORTH.